US011900889B2

(12) United States Patent
Lee et al.

(10) Patent No.: US 11,900,889 B2
(45) Date of Patent: Feb. 13, 2024

(54) DISPLAY DEVICE CAPABLE OF PERFORMING COMPENSATION OPERATION EVEN UNDER MOISTURE PERMEATED CONDITION AND DRIVING METHOD THEREOF

(71) Applicant: LG DISPLAY CO., LTD., Seoul (KR)

(72) Inventors: Hyeongi Lee, Gwangmyeong-si (KR); JaeHong Kim, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/985,953

(22) Filed: Nov. 14, 2022

(65) Prior Publication Data

US 2023/0197015 A1 Jun. 22, 2023

(30) Foreign Application Priority Data

Dec. 17, 2021 (KR) ........................ 10-2021-0181701

(51) Int. Cl.
*G09G 3/32* (2016.01)
*G09G 3/3291* (2016.01)

(52) U.S. Cl.
CPC ............ *G09G 3/3291* (2013.01); *G09G 3/32* (2013.01); *G09G 2300/0852* (2013.01); *G09G 2310/0272* (2013.01); *G09G 2310/08* (2013.01); *G09G 2320/0223* (2013.01)

(58) Field of Classification Search
CPC ... G09G 3/32-3291; G09G 2300/0408; G09G 2300/0421; G09G 2300/0426; G09G 2300/0852; G09G 2310/0243; G09G 2310/0264; G09G 2310/027-0275; G09G 2310/06; G09G 2310/08; G09G 2320/0223; G09G 2320/0233; G09G 2320/0242; G09G 2320/043; G09G 2320/045; G09G 2320/693; G09G 2330/12
See application file for complete search history.

(56) References Cited

U.S. PATENT DOCUMENTS

| | | | | |
|---|---|---|---|---|
| 2007/0216635 A1* | 9/2007 | Kondoh | G09G 3/3629 | |
| | | | 345/101 | |
| 2010/0188324 A1* | 7/2010 | Ohashi | G09G 3/3426 | |
| | | | 345/102 | |
| 2016/0118006 A1* | 4/2016 | Park | G09G 3/3666 | |
| | | | 345/77 | |
| 2021/0173604 A1* | 6/2021 | Park | G06F 3/1423 | |
| 2022/0005401 A1* | 1/2022 | Kang | G09G 3/3225 | |
| 2022/0148515 A1* | 5/2022 | Hong | G09G 3/3275 | |
| 2023/0252922 A1* | 8/2023 | Wang | H10K 50/84 | |
| | | | 345/55 | |

FOREIGN PATENT DOCUMENTS

KR 10-2017-0015649 A 2/2017

* cited by examiner

*Primary Examiner* — Nathan Danielsen
(74) *Attorney, Agent, or Firm* — POLSINELLI PC

(57) ABSTRACT

A display device includes a display panel in which a plurality of pixels is disposed, a timing controller configured to output a sensing pulse and a video data signal, and a data driver configured to apply sensing pulse and outputs a data voltage to the plurality of pixels according to the video data signal, in which the data driver includes a plurality of source integrated circuits, each of the plurality of source integrated circuits receives a plurality of delay pulses, and the timing controller compares timings of the plurality of delay pulses and compensate for the video data signal.

18 Claims, 7 Drawing Sheets

DISPLAY DEVICE CAPABLE OF PERFORMING COMPENSATION OPERATION EVEN UNDER MOISTURE PERMEATED CONDITION AND DRIVING METHOD THEREOF

CROSS-REFERENCE TO RELATED APPLICATION

This application claims the priority of Korean Patent Application No. 10-2021-0181701 filed on Dec. 17, 2021, which is hereby incorporated by reference in its entirety.

BACKGROUND

Field of the Disclosure

The present disclosure relates to a display device and a driving method thereof, and more particularly, to a display device configured to compensate for data and a driving method thereof.

Description of the Background

An organic light emitting display device (OLED) which is a self-emitting device and a liquid crystal display device (LCD) which requires a separate light source have been used for a monitor of a computer, a television, or a cellular phone.

The organic light emitting display device includes a display panel including a plurality of sub pixels and a driver which drives the display panel. The driver includes a gate driver which supplies a gate signal to the display panel and a data driver which supplies a data voltage. When a signal such as a gate signal and a data voltage is supplied to a sub-pixel of the organic light emitting display device, the selected sub-pixel emits light to display images.

In recent years, in order to improve the image quality, a threshold voltage of the driving transistor disposed in the sub-pixel is sensed to compensate for the data based thereon. However, during the process or the usage of the display device, moisture permeation can occur in a configuration of sensing the threshold voltage. In this case, the sensing value of the threshold voltage can be changed and the changed sensing value causes an error in the data compensation.

SUMMARY

Accordingly, the present disclosure is to provide a display device which can normally performs the compensation operation even when moisture permeation occurs.

The present disclosure is also to provide a display device which can convert a degree of moisture permeation into a numerical value to compensate for data.

The present disclosure is not limited to the above-mentioned and other features, which are not mentioned above, can be clearly understood by those skilled in the art from the following descriptions.

In order to achieve the above-described, according to an aspect of the present disclosure, a display device includes a display panel in which a plurality of pixels is disposed; a timing controller configured to output a sensing pulse and a video data signal; and a data driver configured to apply sensing pulse and outputs a data voltage to the plurality of pixels according to the video data signal, in which the data driver includes a plurality of source integrated circuits, each of the plurality of source integrated circuits receives a plurality of delay pulses obtained by the delayed sensing pulse, and the timing controller compares timings of the plurality of delay pulses to compensate for the video data signal.

In another aspect of the present disclosure, a driving method of a display device includes a signal generating step of outputting a sensing pulse; a delay detecting step of analyzing the plurality of delay pulses to output delay information indicating a source integrated circuit in which defect occurs; and a data compensating step of compensating for a video data signal according to the delay information.

In a further aspect of the present disclosure, a display device includes a display panel where a plurality of pixels are disposed; a timing controller configured to output a sensing pulse through a first sensing line for determining moisture permeation in the plurality of pixels; a plurality of source integrated circuits configured to receive the sensing pulse and output a plurality of delay pulses to the timing controller, wherein the timing controller is configured to compare timings of the plurality of delay pulses in a normal state and a defective state, to generate data reflecting the moisture permeation, to compensate for the video data signal based on the generated data reflecting the moisture permeation and configured to output a compensated video signal to the first source integrated circuit through a first feedback line, and wherein the plurality of source integrated circuits are configured to output a data voltage to the plurality of pixels in accordance with the compensated video data signal.

Other matters of the exemplary aspects are included in the detailed description and the drawings.

According to the present disclosure, a defect of a source integrated circuit due to the moisture permeation is identified and thus a video data signal is compensated to solve the defect due to the moisture permeation.

According to the present disclosure, only a sensing line is additionally disposed in the source integrated circuit to detect the defect of the source integrated circuit.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
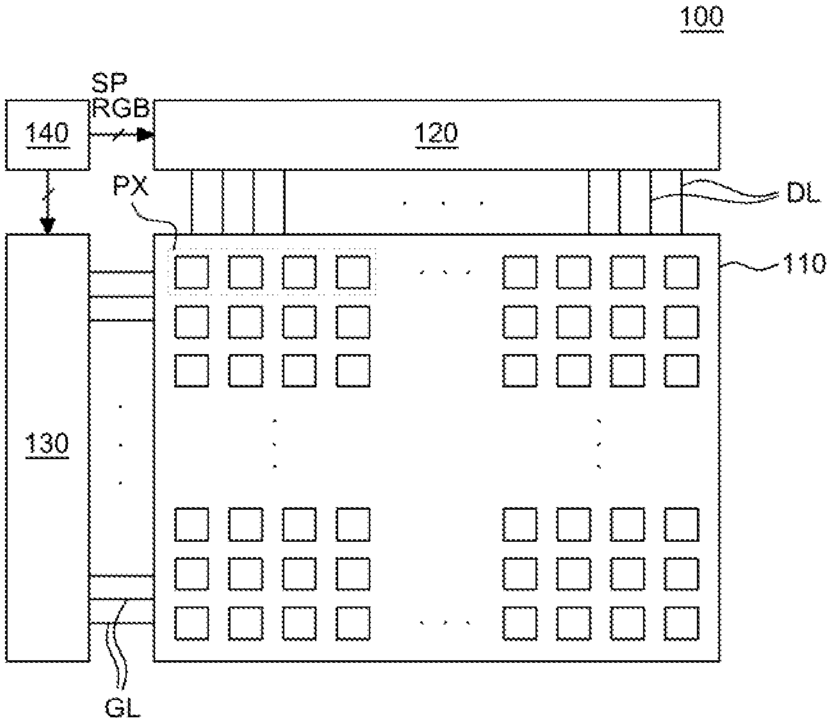
FIG. 1 is a schematic view of a display device according to an exemplary aspect of the present disclosure.

Advantages and characteristics of the present disclosure and a method of achieving the advantages and characteristics will be clear by referring to exemplary aspects described below in detail together with the accompanying drawings. However, the present disclosure is not limited to the exemplary aspects disclosed herein but will be implemented in various forms. The exemplary aspects are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary aspects of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various aspects of the present disclosure can be partially or entirely adhered to or combined with each other and can be interlocked and operated in technically various ways, and the aspects can be carried out independently of or in association with each other.

A transistor used for a display device of the present disclosure may be implemented by one or more transistors among n-channel transistors (NMOS) and p-channel transistors (PMOS). The transistor may be implemented by an oxide semiconductor transistor having an oxide semiconductor as an active layer or a low temperature polysilicon (LTPS) transistor having a an LTPS as an active layer. The transistor may include at least a gate electrode, a source electrode, and a drain electrode. The transistor may be implemented as a thin film transistor on a display panel. In the transistor, carriers flow from the source electrode to the drain electrode. In the case of the n-channel transistor (NMOS), since the carriers are electrons, in order to allow the electrons to flow from the source electrode to the drain electrode, a source voltage may be lower than a drain voltage. A direction of the current in the n-channel transistor NMOS flows from the drain electrode to the source electrode and the source electrode may serve as an output terminal. In the case of the p-channel transistor (PMOS), since the carriers are holes, in order to allow the holes to flow from the source electrode to the drain electrode, a source voltage is higher than a drain voltage. In the p-channel transistor PMOS, the holes flow from the source electrode to the drain electrode so that current flows from the source to the drain and the drain electrode serves as an output terminal. Accordingly, the source and the drain may be switched in accordance with the applied voltage so that it should be noted that the source and the drain of the transistor are not fixed. In the present specification, it is assumed that the transistor is a n-channel transistor (NMOS), but is not limited thereto so that the p-channel transistor may be used and thus a circuit configuration may be changed.

A gate signal of transistors which are used as switching elements swings between a turn-on voltage and a turn-off voltage. The turn-on voltage is set to be higher than a threshold voltage Vth of the transistor and the turn-off voltage is set to be lower than the threshold voltage Vth of the transistor. The transistor is turned on in response to the turn-on voltage and is turned off in response to the turn-off voltage. In the case of the NMOS, the turn-on voltage is a high voltage and the turn-off voltage is a low voltage. In the case of the PMOS, the turn-on voltage may be a low voltage and the turn-off voltage may be a high voltage.

Hereinafter, various exemplary aspects of the present disclosure will be described in detail with reference to accompanying drawings.

FIG. 1 is a schematic view of a display device according to an exemplary aspect of the present disclosure;

Referring to FIG. 1, a display device 100 includes a display panel 110, a data driver 120, a gate driver 130, and a timing controller 140.

The display panel 110 is a panel for displaying images and may include various circuits, wiring lines, and light emitting diodes disposed on a substrate. A plurality of data lines DL and a plurality of gate lines GL intersecting each other are disposed on the substrate. The display panel 110 further includes a plurality of pixels PX connected to the plurality of data lines DL and the plurality of gate lines GL. The display panel 110 has a display area defined by a plurality of pixels PX and a non-display area in which various signal lines or pads are formed. The display panel 110 may be implemented by a display panel 110 used in various display devices such as a liquid crystal display device, an organic light emitting display device, and an electrophoretic display device. Hereinafter, it is described that the display panel 110 is implemented in the organic light emitting display device, but is not limited thereto.

The timing controller 140 receives timing signals such as a vertical synchronization signal, a horizontal synchronization signal, a data enable signal, or a dot clock by means of a receiving circuit such as an LVDS (low-voltage differential signaling) and TMDS (transition-minimized differential signaling) interface connected to a host system. The timing controller 140 generates a data control signal to control the data driver 120 and gate control signals to control the gate driver 130, based on the input timing signal.

The timing controller 140 processes image data RGB input from outside suitable for a size and a resolution of the display panel 110 to convert the image data into a video data signal RGB and then supply the converted video data signal to the data driver 120.

The timing controller 140 supplies a sensing pulse SP for determining a degree of moisture permeation to the data driver 120. For example, the sensing pulse SP may be a square wave which is synchronized with a first rising timing of a dot clock to be output.

The data driver 120 supplies a data voltage DATA to the plurality of sub pixels. The data driver 120 includes a source printed circuit board and a plurality of source integrated circuits. Each of the plurality of source integrated circuits is supplied with video data RGB and a data control signal from the timing controller 140 by means of a source printed circuit board.

The data driver 120 converts video data RGB into a gamma voltage in response to the data control signal to generate a data voltage DATA and supplies the data voltage DATA through the data line DL of the display panel 110.

The plurality of source integrated circuits may be connected to the data line DL of the display panel 100 in the form of chip on film (COF). To be more specific, each of the plurality of source integrated circuits may be implemented as a chip disposed on a connection film and a wiring line connected to a source integrated circuit formed as a chip may be formed on the connection film. However, the placement of the plurality of source integrated circuits is not limited thereto and may be connected to the data line DL of the display panel 110 by a chip on glass (COG) process or a tape automated bonding (TAB) process.

The gate driver 130 supplies a gate signal to the plurality of sub pixels. The gate driver 130 may include a level shifter and a shift register. The level shifter shifts a level of a clock signal input at a transistor-transistor-logic (TTL) level from the timing controller 140 and then supplies the clock signal to the shift register. The shift register may be formed in the non-display area of the display panel 110, by a GIP manner, but is not limited thereto. The shift register is configured by a plurality of stages which shifts the gate signal to output, in response to the clock signal and the driving signal. The plurality of stages included in the shift register sequentially outputs the gate signal through a plurality of output terminals.

The display panel 110 may include a plurality of sub pixels. The plurality of sub pixels may be sub pixels which emit different color light. For example, the plurality of sub pixels may be a red sub pixel, a green sub pixel, a blue sub pixel, and a white sub pixel, but is not limited thereto. The plurality of sub pixels may configure a pixel PX. That is, the red sub pixel, the green sub pixel, the blue sub pixel, and the white sub-pixel configure one pixel PX and the display panel 110 may include a plurality of pixels PX.

Hereinafter, a driving circuit for driving one pixel will be described in more detail with reference to FIG. 2 together.

Figure 2:
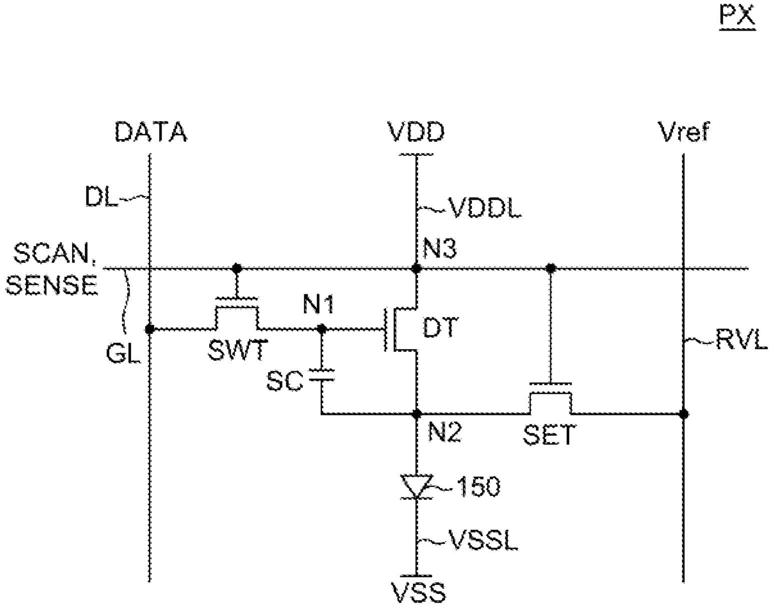
FIG. 2 is a circuit diagram of a sub-pixel of a display device according to an exemplary aspect of the present disclosure.

FIG. 2 is a circuit diagram of a pixel of a display device according to an exemplary aspect of the present disclosure.

FIG. 2 illustrates a circuit diagram for one pixel among a plurality of pixels of the display device 100.

Referring to FIG. 2, the pixel may include a switching transistor SWT, a sensing transistor SET, a driving transistor DT, a storage capacitor SC, and a light emitting diode 150.

The light emitting diode 150 may include an anode, an organic layer, and a cathode. The organic layer may include various organic layers such as a hole injection layer, a hole transport layer, an organic light emitting layer, an electron transport layer, and an electron injection layer. The anode of the light emitting diode 150 may be connected to an output terminal of the driving transistor DT and a low potential voltage VSS is applied to the cathode through the low potential voltage line VSSL. Even though in FIG. 2, it is described that the light emitting diode 150 is an organic light emitting diode 150, the present disclosure is not limited thereto so that as the light emitting diode 150, an inorganic light emitting diode, that is, an LED may also be used.

The above-described low potential voltage line VSSL is a positive voltage line which applies a low potential voltage which is a positive voltage and is denoted as a ground terminal.

Referring to FIG. 2, the switching transistor SWT is a transistor which transmits the data voltage DATA to a first node N1 corresponding to a gate electrode of the driving transistor DT. The switching transistor SWT may include a drain electrode connected to the data line DL, a gate electrode connected to the gate line GL, and a source electrode connected to the gate electrode of the driving transistor DT. The switching transistor SWT is turned on by a scan signal SCAN applied from the gate line GL to transmit a data voltage DATA supplied from the data line DL to the first node N1 corresponding to the gate electrode of the driving transistor DT.

Referring to FIG. 2, the driving transistor DT is a transistor which supplies a driving current to the light emitting diode 150 to drive the light emitting diode 150. The driving transistor DT may include a gate electrode corresponding to the first node N1, a source electrode corresponding to a second node N2 and an output terminal, and a drain electrode corresponding to a third node N3 and an input terminal. The gate electrode of the driving transistor DT is connected to the switching transistor SWT, the drain electrode is applied with a high potential voltage VDD by means of a high potential voltage line VDDL, and the source electrode is connected to the anode of the light emitting diode 150.

Referring to FIG. 2, a storage capacitor SC is a capacitor which maintains a voltage corresponding to the data voltage DATA for one frame. One electrode of the storage capacitor SC is connected to the first node N1 and the other electrode is connected to the second node N2.

In the meantime, in the case of the display device 100, as the driving time of each pixel is increased, the circuit element such as the driving transistor DT may be degraded. Accordingly, a unique characteristic value of the circuit element such as a driving transistor DT may be changed. Here, the unique characteristic value of the circuit element may include a threshold voltage Vth of the driving transistor DT or a mobility a of the driving transistor DT. The change in the characteristic value of the circuit element may cause a luminance change of the corresponding pixel. Accordingly, the change in the characteristic value of the circuit element may be used as the same concept as the luminance change of the pixel.

Further, the degree of the change in the characteristic values between circuit elements of each pixel may vary depending on a degree of degradation of each circuit element. Such a difference in the changing degree of the characteristic values between the circuit elements may cause a luminance deviation between the pixels. Accordingly, the characteristic value deviation between circuit elements may be used as the same concept as the luminance deviation between the pixels. The change in the characteristic values of the circuit elements, that is, the luminance change of the pixel and the characteristic value deviation between the circuit elements, that is, the luminance deviation between the pixels may cause problems such as the lowering of the accuracy for luminance expressiveness of the pixel or screen abnormality.

Therefore, the pixel of the display device 100 according to the exemplary aspect of the present disclosure provides a sensing function of sensing a characteristic value for the pixel and a compensating function of compensating for the characteristic value of the pixel using the sensing result.

Therefore, as illustrated in FIG. 2, the pixel may further include a sensing transistor SET to effectively control a voltage state of the source electrode of the driving transistor DT, in addition to the switching transistor SWT, the driving transistor DT, the storage capacitor SC, and the light emitting diode 150.

Referring to FIG. 2, the sensing transistor SET is connected between the source electrode of the driving transistor DT and the reference voltage line RVL which supplies a reference voltage Vref and a gate electrode is connected to the gate line GL. Therefore, the sensing transistor SET is turned on by the sensing signal SENSE applied through the gate line GL to apply the reference voltage Vref which is supplied through the reference voltage line RVL to the source electrode of the driving transistor DT. Further, the sensing transistor SET may be utilized as one of voltage sensing paths for the source electrode of the driving transistor DT.

Referring to FIG. 2, the switching transistor SWT and the sensing transistor SET of the pixel may share one gate line GL. That is, the switching transistor SWT and the sensing transistor SET are connected to the same gate line GL to be applied with the same gate signal. However, for the convenience of description, a voltage which is applied to the gate electrode of the switching transistor SWT is referred to as a scan signal SCAN and a voltage which is applied to the gate electrode of the sensing transistor SET is referred to as a sensing signal SENSE. However, the scan signal SCAN and the sensing signal SENSE applied to one pixel are the same signal which is transmitted from the same gate line GL.

However, the present disclosure is not limited thereto so that only the switching transistor SWT is connected to the gate line GL and the sensing transistor SET may be connected to a separate sensing line. Therefore, the scan signal SCAN is applied to the switching transistor SWT through the gate line GL and the sensing signal SENSE is applied to the sensing transistor SET through the sensing line.

Accordingly, the reference voltage Vref is applied to the source electrode of the driving transistor DT by means of the sensing transistor SET. Further, a voltage for sensing the threshold voltage Vth of the driving transistor DT or the mobility a of the driving transistor DT is detected by the reference voltage line RVL. Further, the data driver 120 may compensate for the data voltage DATA in accordance with a variation of the threshold voltage Vth of the driving transistor DT or the mobility a of the driving transistor DT.

Hereinafter, the data driver of the display device according to the exemplary aspect of the present disclosure will be described in detail with reference to FIGS. 3 and 4 together.

Figure 3:
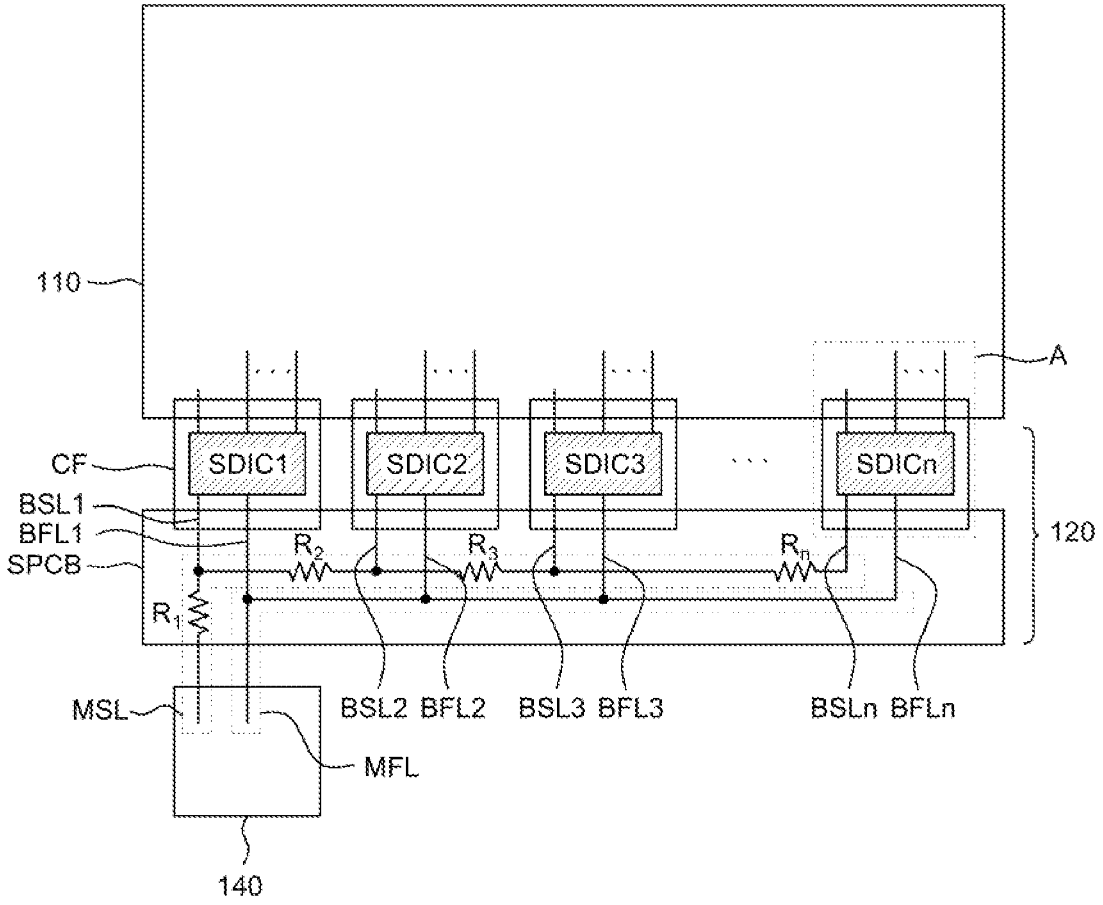
FIG. 3 is a view for explaining a connection relationship of a data driver of a display device according to an exemplary aspect of the present disclosure.

FIG. 3 is a view for explaining a connection relationship of a data driver of a display device according to an exemplary aspect of the present disclosure.

Figure 4:
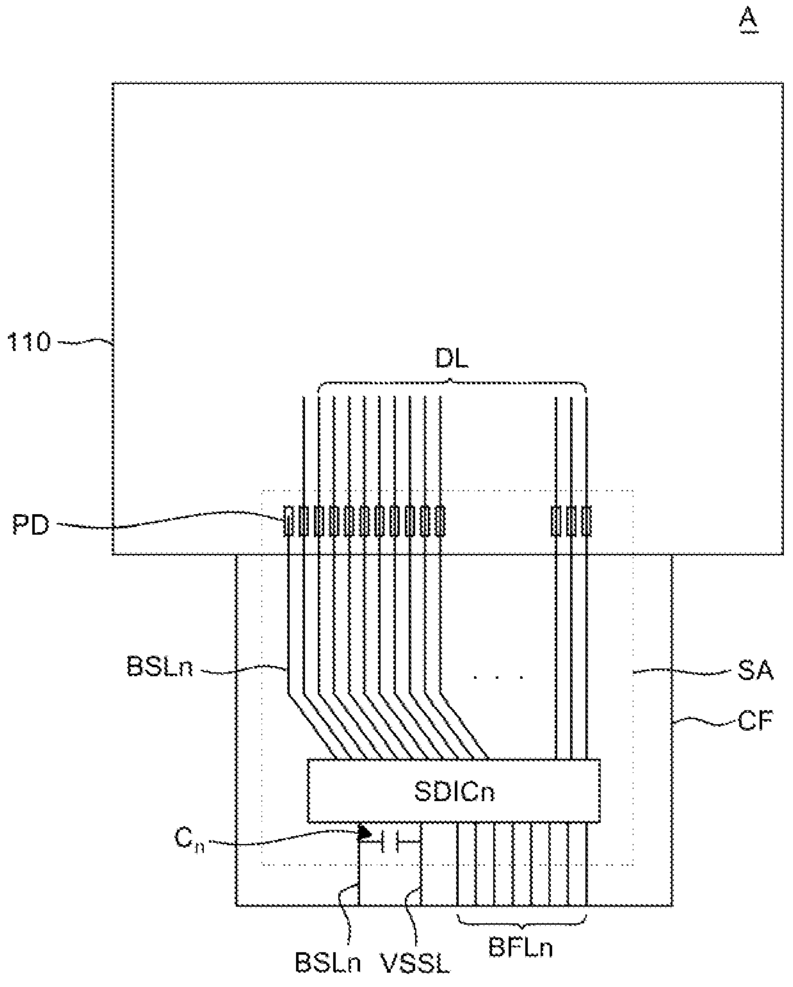
FIG. 4 is an enlarged view of area "A" of FIG. 3.

FIG. 4 is an enlarged view of area "A" of FIG. 3.

Referring to FIG. 3, the data driver 120 includes a plurality of source integrated circuits SDIC1, SDIC2, SDIC3, . . . , SDICn and a source printed circuit board SPCB which are disposed in the chip on film (COF) manner.

Specifically, the display panel 110 and the source printed circuit board SPCB are connected by a plurality of connection films CF and the plurality of source integrated circuits SDIC1, SDIC2, SDIC3, . . . , SDICn may be disposed on the plurality of connection films CF. In other words, the display panel 110 and the source printed circuit board SPCB are attached on both sides of the plurality of connection films CF and the plurality of source integrated circuits SDIC1, SDIC2, SDIC3, . . . , SDICn may be disposed in the plurality of connection films CF.

A sensing line and a feedback line may be disposed in the source printed circuit board SPCB and the plurality of source integrated circuits SDIC1, SDIC2, SDIC3, . . . , SDICn.

The feedback line may include a main feedback line MFL and a plurality of branch feedback lines BFL1, BFL2, BFL3, . . . , BFLn branched from the main feedback line MFL.

Referring to FIG. 3, the main feedback line MFL extends from the timing controller 140 to be formed on the source printed circuit board SPCB. The plurality of branch feedback lines BFL1, BFL2, BFL3, . . . BFLn extends from the source printed circuit board SPCB to be connected to the plurality of source integrated circuits SDIC1, SDIC2, SDIC3, . . . , SDICn.

For example, the first branch feedback line BFL1 extends from the main feedback line MFL to be connected to the first source integrated circuit SDIC1. The second branch feedback line BFL2 extends from the main feedback line MFL to be connected to the second source integrated circuit SDIC2. The third branch feedback line BFL3 extends from the main feedback line MFL to be connected to the third source integrated circuit SDIC3. The n-th branch feedback line BFLn extends from the main feedback line MFL to be connected to the n-th source integrated circuit SDICn.

Therefore, the plurality of source integrated circuits SDIC1, SDIC2, SDIC3, . . . SDICn transmits a voltage value to which a threshold voltage Vth of the driving transistor DT or a mobility a of the driving transistor DT is reflected and a clock signal to the main feedback line MFL through each of the plurality of branch feedback lines BFL1, BFL2, BFL3, . . . BFLn. The main feedback line MFL transmits voltage value to which a threshold voltage Vth of the driving transistor DT or a mobility a of the driving transistor DT is reflected and a clock signal to the timing controller 140.

Further, the timing controller 140 outputs the video data signal RGB through the main feedback line MFL and the video data signal RGB is transmitted to the plurality of source integrated circuits SDIC1, SDIC2, SDIC3, . . . SDICn through each of the plurality of branch feedback lines BFL1, BFL2, BFL3, . . . BFLn.

Referring to FIG. 4, each of the plurality of source integrated circuits SDIC1, SDIC2, SDIC3, . . . SDICn is connected to the plurality of data lines DL through a plurality of pads PD disposed on the display panel 110. Therefore, each of the plurality of source integrated circuits SDIC1, SDIC2, SDIC3, . . . SDICn outputs a data voltage to the data lines DL.

In the meantime, the sensing line includes a main sensing line MSL and a plurality of branch sensing lines BSL1, BSL2, BSL3, . . . BSLn branched from the main sensing line MSL.

Referring to FIG. 3, the main sensing line MSL extends from the timing controller 140 to be formed on the source printed circuit board SPCB. The plurality of branch sensing lines BSL1, BSL2, BSF3, . . . BSLn extends from the source printed circuit board SPCB to be connected to the plurality of source integrated circuits SDIC1, SDIC2, SDIC3, . . . , SDICn, respectively.

For example, the first branch sensing line BSL1 extends from the main sensing line MSL to be connected to the first source integrated circuit SDIC1. The second sensing feedback line BSL2 extends from the main sensing line MSL to be connected to the second source integrated circuit SDIC2. The third sensing feedback line BSL3 extends from the main sensing line MSL to be connected to the third source integrated circuit SDIC3. The n-th sensing feedback line BSLn extends from the main sensing line MSL to be connected to the n-th source integrated circuit SDICn.

Therefore, the timing controller 140 outputs a sensing pulse SP to the main sensing line MSL and the sensing pulse SP is transmitted to the plurality of source integrated circuits SDIC1, SDIC2, SDIC3, . . . , SDICn through the plurality of branch sensing lines BSL1, BSL2, BSL3, . . . BSLn.

Referring to FIG. 3, a plurality of resistors $R_1$, $R_2$, $R_3$, . . . , $R_n$ may be disposed in the main sensing line MSL. Each of the plurality of resistors $R_1$, $R_2$, $R_3$, . . . , $R_n$ may be disposed between any one of the plurality of source integrated circuits SDIC1, SDIC2, SDIC3, . . . , SDICn and the timing controller 140 or may be disposed between the plurality of source integrated circuits SDIC1, SDIC2, SDIC3, . . . , SDICn.

Specifically, the first resistor $R_1$ is disposed between the timing controller 140 and the first branch sensing line BSL1 connected to the first source integrated circuit SDIC1. The second resistor $R_2$ is disposed between the first branch sensing line BSL1 connected to the first source integrated circuit SDIC1 and the second branch sensing line BSL2 connected to the second source integrated circuit SDIC2. The third resistor $R_3$ is disposed between the second branch sensing line BSL2 connected to the second source integrated circuit SDIC2 and the third branch sensing line BSL3 connected to the third source integrated circuit SDIC3. The n-th resistor $R_n$ is disposed between a n−1-th branch sensing line BSL connected to a n−1-th source integrated circuit SDIC and the n-th branch sensing line BSLn connected to the n-th source integrated circuit SDICn.

Referring to FIG. 4, each of the plurality of branch sensing lines BSLn passes through the plurality of source integrated circuits SDICn to extend to the pad PD formed on the display panel 110. Each of the plurality of low potential voltage lines VSSL passes through each of the plurality of source integrated circuits SDICn to extend into the display panel 110 by means of the pad PD formed on the display panel 110. The plurality of data lines DL may extend into the display panel 110 by means of the pad PD formed on the display panel 110. That is, unlike the data line DL and the low potential line VSSL, each of the plurality of branch sensing lines BSLn does not extend into the display panel 110, but may extend only to the pad PD disposed at the outside the display panel 110.

A sealing area SA may be disposed so as to cover the plurality of pads PD and the plurality of source integrated circuits SDICn. Specifically, in the sealing area SA, an adhesive member covers not only the plurality of pads PD and the plurality of source integrated circuits SDIC1, SDIC2, SDIC3, . . . , SDICn, but also the branch sensing line BSLn, the low potential voltage line VSSL, and the plurality of data lines DL.

However, as described above, each of the plurality of branch sensing lines BSL1, BSL2, BSL3, . . . , BSLn does not extend into the display panel 110, but extend only to the pad PD disposed at the outside of the display panel so that the plurality of branch sensing lines BSL1, BSL2, BSL3, . . . , BSLn is disposed in the sealing area SA. In contrast, the data line DL and the low potential line VSSL may extend to the outside of the sealing area SA to extend into the display panel 110.

Each of the plurality of low potential voltage lines VSSL may be disposed at one side of each of the plurality of branch sensing lines BSL1, BSL2, BSL3, . . . BSLn.

Therefore, an adhesive member which is a dielectric is disposed between each of the plurality of branch sensing lines BSL1, BSL2, BSL3, . . . , BSLn and each of the plurality of low potential voltage lines VSSL so that a capacitor $C_n$ may be configured in the sealing area SA.

That is, a first capacitor $C_1$ may be configured in a sealing area SA which covers the first source integrated circuit SDIC1. A second capacitor $C_2$ may be configured in a sealing area SA which covers the second source integrated circuit SDIC2. A third capacitor $C_3$ may be configured in a sealing area SA which covers the third source integrated circuit SDIC3. A n-th capacitor $C_n$ may be configured in a sealing area SA which covers the n-th source integrated circuit SDICn.

Figure 5:
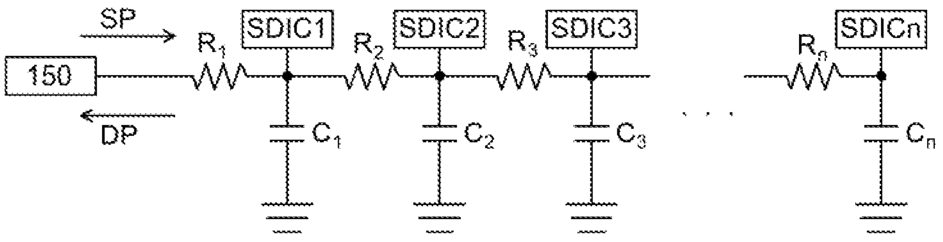
FIG. 5 is a circuit diagram for explaining a RC circuit of a data driver of a display device according to an exemplary aspect of the present disclosure.

FIG. 5 is a circuit diagram for explaining a RC circuit of a data driver of a display device according to an exemplary aspect of the present disclosure.

Figure 6:
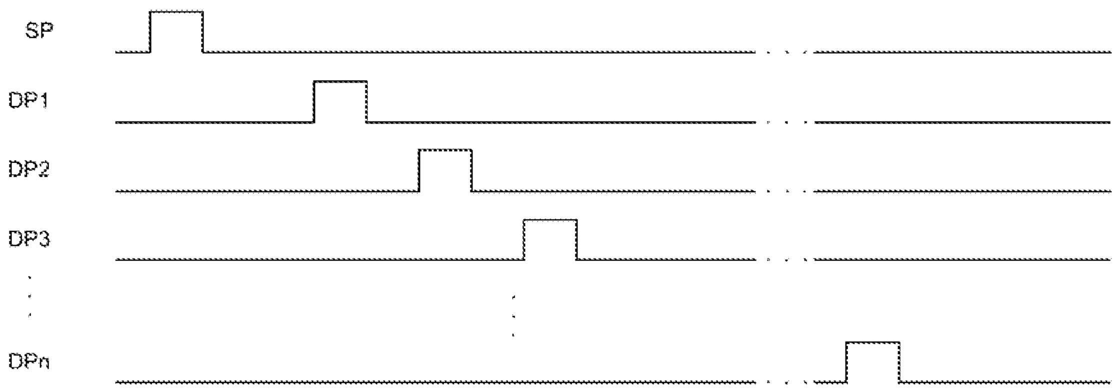
FIG. 6 is a waveform of a sensing pulse and a delay pulse in a normal state of a display device according to an exemplary aspect of the present disclosure.

FIG. 6 is a waveform of a sensing pulse and a delay pulse in a normal state of a display device according to an exemplary aspect of the present disclosure.

As illustrated in FIG. 5, according to a structure of the data driver 120, an RC circuit is formed between the timing controller 140 and the plurality of source integrated circuits SDIC1, SDIC2, SDIC3, . . . , SDICn.

Specifically, the first capacitor $C_1$ is disposed between the first source integrated circuit SDIC 1 and a ground terminal and the first resistor $R_1$ is disposed between the first source integrated circuit SDIC1 and the timing controller 140. The second capacitor $C_2$ is disposed between the second source integrated circuit SDIC2 and the ground terminal and the first resistor $R_1$ and the second resistor $R_2$ are disposed between the second source integrated circuit SDIC2 and the timing controller 140. The third capacitor $C_3$ is disposed between the third source integrated circuit SDIC3 and the ground terminal and the first resistor $R_1$ to the third resistor $R_3$ are disposed between the third source integrated circuit SDIC3 and the timing controller 140. The n-th capacitor $C_n$ is disposed between the n-th source integrated circuit SDICn and the ground terminal and the first resistor $R_1$ to the n-th resistor $R_n$ are disposed between the n-th source integrated circuit SDICn and the timing controller 140.

That is, the above-described RC circuit may be modeled as an Elmore delay circuit.

Therefore, a n-th time constant in of the n-th delay pulse DPn received by the n-th source integrated circuit SDICn among the plurality of source integrated circuits SDIC1, SDIC2, SDIC3, SDICn may be calculated by Equation 1.

$$\tau_n = \sum_{i=1}^{n} R_i \times \sum_{i=1}^{n} C_i \quad \text{[Equation 1]}$$

The above-described time constant is a parameter meaning a time when an arbitrary pulse reaches 63.2% of a target level and is a standard indicating a degree of delay of a delay pulse.

However, $\tau_n$ is a time constant of the n-th delay pulse, $R_i$ is any one of the plurality of resistors, $C_i$ is any one of the plurality of capacitors, and n is a natural number which is 1 or larger.

That is, the sensing pulse SP output from the timing controller 140 is delayed by a first time constant $\tau_1$ to be received in the first source integrated circuit SDIC1 as a first delay pulse DP1. The first time constant $\tau_1$ may be calculated by $R_1 \times C_1$.

The sensing pulse SP output from the timing controller 140 is delayed by a second time constant $\tau_2$ to be received in the second source integrated circuit SDIC2 as a second delay pulse DP2. The second time constant $\tau_2$ may be calculated by $(R_1+R_2)\times(C_1+C_2)$.

The sensing pulse SP output from the timing controller 140 is delayed by a third time constant $\tau_3$ to be received in the third source integrated circuit SDIC3 as a third delay pulse DP3. The third time constant $\tau_3$ may be calculated by $(R_1+R_2+R_3)\times(C_1+C_2+C_3)$.

The sensing pulse SP output from the timing controller 140 is delayed by an n-th time constant $\tau_3$ to be received in the n-th source integrated circuit SDICn as an n-th delay pulse DPn. The n-th time constant $\tau_3$ may be calculated by Equation 1.

That is, the second time constant $\tau_2$ is larger than the first time constant $\tau_1$, the third time constant $\tau_3$ is larger than the second time constant $\tau_2$, and the n-th time constant $\tau_n$ is larger than the third time constant $\tau_3$.

Therefore, a rising timing of the first delay pulse DP1 is later than a rising timing of the second delay pulse DP2, a rising timing of the third delay pulse DP3 is later than the rising timing of the second delay pulse DP2, and a rising timing of the n-th delay pulse DPn is later than the rising timing of the third delay pulse DP3.

That is, the plurality of delay pulses DP1, DP2, DP3, . . . , DPn sequentially rises.

Figure 7:
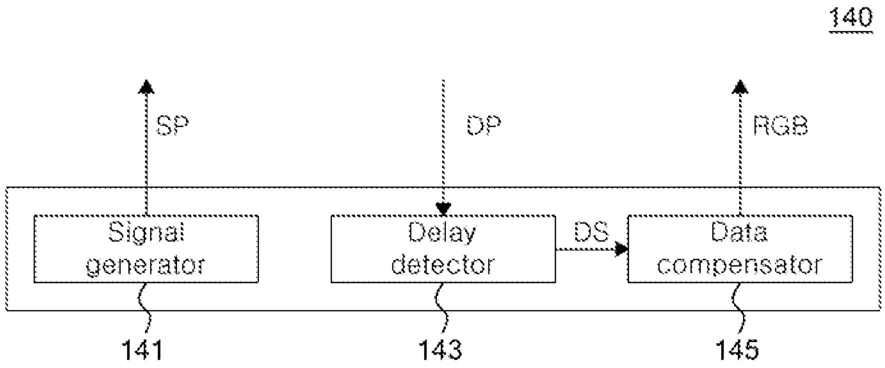
FIG. 7 is a block diagram for explaining a timing controller of a display device according to an exemplary aspect of the present disclosure.

FIG. 7 is a block diagram for explaining a timing controller of a display device according to an exemplary aspect of the present disclosure.

Figure 8:
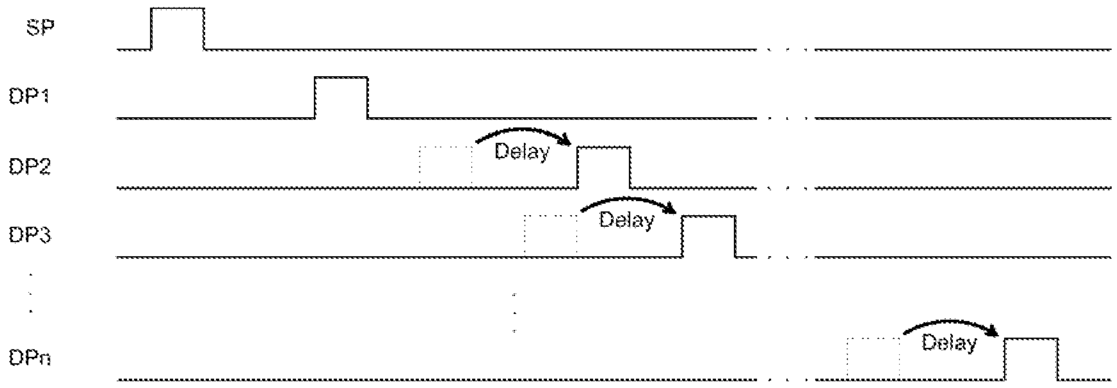
FIG. 8 is a waveform of a sensing pulse and a delay pulse in a defective state of a display device according to an exemplary aspect of the present disclosure.

FIG. 8 is a waveform of a sensing pulse and a delay pulse in a defective state of a display device according to an exemplary aspect of the present disclosure.

For reference, in FIG. 8, the delay pulses DP1, DP2, DP3, . . . , DP4 in the normal state are denoted with solid lines and the delay pulses DP1, DP2, DP3, . . . , DP4 in the defective state are denoted with dotted lines.

Referring to FIG. 5, the timing controller 140 of the display device according to the exemplary aspect of the present disclosure includes a signal generator 141, a delay detector 143, and a data compensator 145. The signal generator 141 outputs a sensing pulse SP, the delay detector 143 outputs delay information DS, and the data compensator 145 compensates for a video data signal RGB to output the compensated video data signal.

The signal generator 141 outputs the sensing pulse SP to the sensing line. The sensing pulse SP may be a square wave which is synchronized with a first rising timing of a dot clock to be output.

The delay detector 143 identifies a delay time of the plurality of delay pulses DP1, DP2, DP3, . . . , DPn to generate delay information DS. That is, the delay detector 143 compares a timing of each of the plurality of delay pulses DP1, DP2, DP3, . . . , DPn in the normal state and a timing of each of the of delay pulses DP1, DP2, DP3, . . . , DPn to generate the delay information DS. The delay information DS indicates information of a source integrated circuit in which a defect occurs, among the plurality of source integrated circuits SDIC1, SDIC2, SDIC3, . . . , SDICn.

Specifically, moisture permeation may be generated in the sealing area SA between at least one of the plurality of source integrated circuits SDIC1, SDIC2, SDIC3, . . . , SDICn in the defective state and the display panel 110. That is, water having a permittivity higher than the adhesive member may permeate the sealing area SA of a specific source integrated circuit. For example, a permittivity of the adhesive member disposed in the sealing area SA is 3 to 10, but a permittivity of water is 55 to 77. Therefore, in the source integrated circuit in which the defect occurs, a capacitance of the capacitor formed between the branch sensing lines BSL1, BSL2, BSL3, . . . , BSLn and the low potential voltage line VSSL is increased.

For example, referring to FIGS. 3 to 5, when moisture permeates the sealing area SA of the second source integrated circuit SDIC2 among the plurality of source integrated circuits SDIC1, SDIC2, SDIC3, . . . , SDICn, a capacitance of the second capacitor $C_2$ may be increased.

As described above, the n-th time constant is calculated by Equation 2, so that all the time constants after the second time constant $\tau_2$ may be increased.

Referring to FIG. 8, the first time constant $\tau_1$ in the defective state is equal to that in the normal state so that the rising timing of the first delay pulse DP1 is not changed.

In contrast, in the defective state, the second time constant $\tau_2$ is increased so that the rising timing of the second delay pulse DP2 in the defective state is delayed more than the rising timing of the second delay pulse DP2 in the normal state.

In the defective state, the third time constant $\tau_3$ is increased so that the rising timing of the third delay pulse DP3 in the defective state is delayed more than the rising timing of the third delay pulse DP3 in the normal state.

In the defective state, the n-th time constant $\tau_n$ is increased so that the rising timing of the n-th delay pulse DPn in the defective state is delayed more than the rising timing of the n-th delay pulse DPn in the normal state.

In the meantime, the data compensator 145 outputs a video data signal RGB compensated according to the delay information DS. Specifically, the data compensator 145 compensates for a video data signal RGB allocated to a source integrated circuit in which the defect occurs, according to the delay information DS. As the compensating method of the video data signal RGB, the video data signal RGB is compensated with an average of video data signals RGB allocated to source integrated circuits which are adjacent to the source integrated circuit in which the defect occurs and are not defective. However, the compensating method of the video data signal RGB is not limited thereto and various compensating methods may be applied.

For example, as illustrated in FIG. 8, when the second delay pulse DP2 to the n-th delay pulse DPn are further delayed so that it is confirmed that the water permeates the second source integrated circuit SDIC2 through the delay information DS, a video data signal RGB allocated to the second source integrated circuit SDIC2 may be an average of a video data signal RGB allocated to the first source integrated circuit SDIC1 and a video data signal RGB allocated to the third source integrated circuit SDIC3.

Therefore, the display device according to the exemplary aspect of the present disclosure identifies a defect of a source integrated circuit due to the moisture permeation and compensates for a video data signal to solve the defect due to the moisture permeation.

That is, the display device according to the exemplary aspect of the present disclosure additionally disposes only a sensing line in the source integrated circuit to detect the defect of the source integrated circuit.

Hereinafter, a driving method of a display device according to an exemplary aspect of the present disclosure will be described. The driving method of a display device according to an exemplary aspect of the present disclosure will be described based on the above-described configuration of the display device and like component is denoted by like reference numeral.

Figure 9:
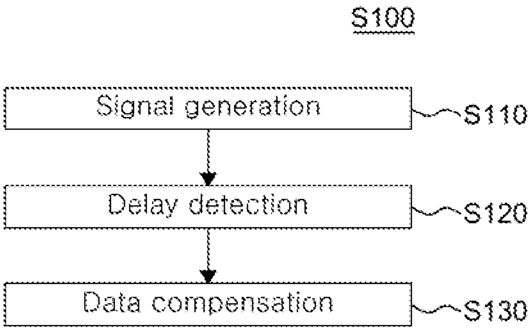
FIG. 9 is a flowchart for explaining a driving method of a display device according to one exemplary aspect of the present disclosure.

FIG. 9 is a flowchart for explaining a driving method of a display device according to one exemplary aspect of the present disclosure.

Referring to FIG. 9, a driving method S100 of a display device according to the exemplary aspect of the present disclosure includes a signal generating step S110, a delay detecting step S120, and a data compensating step S130. In the signal generating step S110, a sensing pulse is output, in the delay detecting step S120, delay information DS is output, and in the data compensating step S130, a video data signal RGB is compensated to be output.

In the signal sensing step S110, the sensing pulse SP is output to the sensing line. The sensing pulse SP may be a square wave which is synchronized with a first rising timing of a dot clock to be output.

In the delay detecting step S120, a delay time of the plurality of delay pulses DP1, DP2, DP3, . . . , DPn is identified to generate delay information DS. That is, in the delay detecting step S120, a timing of each of the plurality of delay pulses DP1, DP2, DP3, . . . , DPn in the normal state and a timing of each of the of delay pulses DP1, DP2, DP3, . . . , DPn in the defective state are compared to generate the delay information DS. The delay information DS indicates information of a source integrated circuit in which a defect occurs, among the plurality of source integrated circuits SDIC1, SDIC2, SDIC3, . . . , SDICn.

Specifically, moisture permeation may be generated in the sealing area SA between at least one of the plurality of source integrated circuits SDIC1, SDIC2, SDIC3, . . . , SDICn in the defective state and the display panel 110. That is, water having a permittivity higher than the adhesive member may permeate the sealing area SA of a specific source integrated circuit. For example, a permittivity of the adhesive member disposed in the sealing area SA is 3 to 10, but a permittivity of water is 55 to 77. Therefore, in the source integrated circuit in which defect occurs, a capacitance of a capacitor formed between the branch sensing line and the low potential voltage line is increased.

For example, referring to FIGS. 3 to 5, when moisture permeates the sealing area SA of the second source integrated circuit SDIC2 among the plurality of source integrated circuits SDIC1, SDIC2, SDIC3, . . . , SDICn, a capacitance of the second capacitor $C_2$ may be increased.

As described above, the n-th time constant is calculated by Equation 2, so that all the time constants after the second time constant $\tau_2$ may be increased.

Referring to FIG. 8, the first time constant $\tau_1$ in the defective state is equal to that in the normal state so that the rising timing of the first delay pulse DP1 is not changed.

In contrast, in the defective state, the second time constant $\tau_2$ is increased so that the rising timing of the second delay pulse DP2 in the defective state is delayed more than the rising timing of the second delay pulse DP2.

In the defective state, the third time constant $\tau_3$ is increased so that the rising timing of the third delay pulse DP3 in the defective state is delayed more than the rising timing of the third delay pulse DP3 in the normal state.

In the defective state, the n-th time constant in is increased so that the rising timing of the n-th delay pulse DPn in the defective state is delayed more than the rising timing of the n-th delay pulse DPn in the normal state.

In the meantime, in the data compensating step S130, a video data signal RGB compensated according to the delay information DS is output. Specifically, in the data compensating step S130, a video data signal RGB allocated to a source integrated circuit in which the defect occurs is compensated according to the delay information DS. As the compensating method of the video data signal RGB, the video data signal RGB is compensated with an average of video data signals RGB allocated to source integrated circuits which are adjacent to the source integrated circuit in which the defect occurs and are not defective. However, the compensating method of the video data signal RGB is not limited thereto and various compensating methods may be applied.

For example, as illustrated in FIG. 8, when the second delay pulse DP2 to the n-th delay pulse DPn are further delayed so that it is confirmed that the water permeates the second source integrated circuit SDIC2 through the delay information DS, a video data signal RGB allocated to the second source integrated circuit SDIC2 may be an average of a video data signal RGB allocated to the first source integrated circuit SDIC1 and a video data signal RGB allocated to the third source integrated circuit SDIC3.

Therefore, according to the driving method of the display device according to the exemplary aspect of the present disclosure, it is possible to identify a defect of a source integrated circuit due to the moisture permeation and compensate for a video data signal to solve the defect due to the moisture permeation.

The exemplary aspects of the present disclosure can also be described as follows:

According to an aspect of the present disclosure, a display device includes a display panel in which a plurality of pixels is disposed; a timing controller configured to output a sensing pulse and a video data signal; and a data driver configured to apply sensing pulse and outputs a data voltage to the plurality of pixels according to the video data signal, in which the data driver includes a plurality of source integrated circuits, each of the plurality of source integrated circuits receives a plurality of delay pulses obtained by the delayed sensing pulse, and the timing controller compares timings of the plurality of delay pulses to compensate for the video data signal.

The data driver further may include a source printed circuit board connected to the plurality of source integrated circuits, a sensing line is formed in the source printed circuit board and the plurality of source integrated circuits, and the sensing pulse is transmitted through the sensing line.

The sensing line may include a main sensing line disposed on the source printed circuit board and a branch sensing line which is branched from the main sensing line and is connected to each of the plurality of source integrated circuits.

Each of the plurality of branch sensing lines may extend only to a pad formed on the display panel.

At least one positive power line may be disposed at one side of each of the plurality of branch sensing lines.

Each of the plurality of branch sensing lines and the at least one positive power line may be covered by an adhesive member.

Each of the plurality of branch sensing lines and the at least one positive power line may configure a plurality of capacitors.

A plurality of resistors may be disposed in the sensing line and each of the plurality of resistors is disposed between any one of the plurality of source integrated circuits and the timing controller or is disposed between the plurality of source integrated circuits.

A time constant of a n-th delay pulse received to a n-th source integrated circuits, among the plurality of source integrated circuits, is calculated by Equation 1.

$$\tau_n = \sum_{i=1}^{n} R_i \times \sum_{i=1}^{n} C_i \quad \text{[Equation 1]}$$

(However, $\tau_n$ is a time constant of the n-th delay pulse, Ri is any one of the plurality of resistors, Ci is any one of the plurality of capacitors, and n is a natural number which is 1 or larger.)

The timing controller may include a signal generator configured to output the sensing pulse; a delay detector configured to analyze the plurality of delay pulses to output delay information indicating a source integrated circuit in which a defect occurs; and a data compensator configured to compensate for the video data signal according to the delay information.

The delay detector may compare a timing of each of a plurality of delay pulses in a normal state and a timing of each of a plurality of delay pulses in a defective state to generate delay information indicating a source integrated circuit in which the defect occurs.

The data compensator may compensate for a video data signal allocated to a source integrated circuit in which a defect occurs according to the delay information with an average of video data signals allocated to a source integrated circuits adjacent to the source integrated circuit in which the defect occurs.

According to another aspect of the present disclosure, a driving method of a display device includes a signal generating step of outputting a sensing pulse; a delay detecting step of analyzing the plurality of delay pulses to output delay information indicating a source integrated circuit in which defect occurs; and a data compensating step of compensating for a video data signal according to the delay information.

In the delay detecting step, a timing of each of a plurality of delay pulses in a normal state and a timing of each of a plurality of delay pulses in a defective state may be compared to generate delay information indicating a source integrated circuit in which the defect occurs.

In the data compensating step, a video data signal allocated to a source integrated circuit in which a defect occurs according to the delay information may be compensated with an average of video data signals allocated to a source integrated circuits adjacent to the source integrated circuit in which the defect occurs.

Although the exemplary aspects of the present disclosure have been described in detail with reference to the accompanying drawings, the present disclosure is not limited thereto and may be embodied in many different forms without departing from the technical concept of the present disclosure. Therefore, the exemplary aspects of the present disclosure are provided for illustrative purposes only but not intended to limit the technical concept of the present disclosure. The scope of the technical concept of the present disclosure is not limited thereto. Therefore, it should be understood that the above-described exemplary aspects are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device, comprising:

a display panel in which a plurality of pixels is disposed;

a timing controller configured to output a sensing pulse and a video data signal; and a data driver configured to apply the sensing pulse and outputs a data voltage to the plurality of pixels according to the video data signal, and including a plurality of source integrated circuits, each of the plurality of source integrated circuits receiving a plurality of delay pulses from the timing controller, wherein the timing controller compares timings of the plurality of delay pulses to compensate for the video data signal, wherein the data driver further includes a source printed circuit board connected to the plurality of source integrated circuits and a sensing line formed in the source printed circuit board and the plurality of source integrated circuits, and wherein the sensing pulse is transmitted through the sensing line.

2. The display device according to claim 1, wherein the sensing line includes:

a main sensing line disposed on the source printed circuit board and the timing controller; and a branch sensing line branched from the main sensing line and connected to each of the plurality of source integrated circuits.

3. The display device according to claim 2, wherein each of the plurality of branch sensing lines extends to a pad disposed on the display panel.

4. The display device according to claim 2, further comprising at least one positive power line disposed at each of the plurality of branch sensing lines.

5. The display device according to claim 4, further comprising an adhesive member covering each of the plurality of branch sensing lines and the at least one positive power line.

6. The display device according to claim 5, wherein each of the plurality of branch sensing lines and the at least one positive power line form a plurality of capacitors.

7. The display device according to claim 6, wherein the plurality of resistors are disposed in the sensing line and each of the plurality of resistors is disposed between one of the plurality of source integrated circuits and the timing controller or disposed between the plurality of source integrated circuits.

8. The display device according to claim 7, wherein a time constant of a n-th delay pulse for an n-th source integrated circuit among the plurality of source integrated circuits is calculated by Equation 1, $$\tau_n = \sum_{i=1}^{n} R_i \times \sum_{i=1}^{n} C_i \quad \text{[Equation 1]}$$

where $\tau_n$ is a time constant of the n-th delay pulse, Ri is one of the plurality of resistors, Ci is one of the plurality of capacitors, and n is a natural number.

9. The display device according to claim 1, wherein the timing controller includes:

a signal generator configured to output the sensing pulse;

a delay detector configured to analyze the plurality of delay pulses and output delay information indicating a source integrated circuit having a defect; and a data compensator configured to compensate for the video data signal according to the delay information.

10. The display device according to claim 9, wherein the delay detector is configured to compare a timing of each of a plurality of delay pulses in a normal state and a timing of each of a plurality of delay pulses in a defective state and to generate the delay information indicating the source integrated circuit having the defect.

11. The display device according to claim 10, wherein the data compensator is configured to compensate for a video data signal allocated to the source integrated circuit having the defect according to the delay information with an average of video data signals allocated to a source integrated circuits adjacent to the source integrated circuit having the defect.

12. A driving method of a display device which includes a display panel in which a plurality of pixels is disposed, a timing controller configured to output a sensing pulse and a video data signal, and a data driver which receives a plurality of delay pulses, the driving method comprising:

a signal generating step of outputting the sensing pulse;

a delay detecting step of analyzing the plurality of delay pulses and outputting delay information indicating a source integrated circuit having a defect; and a data compensating step of compensating for the video data signal according to the delay information, wherein, in the delay detecting step, a timing of each of a plurality of delay pulses in a normal state and a timing of each of a plurality of delay pulses in a defective state are compared and the delay information indicating a source integrated circuit having the defect is generated.

13. The driving method according to claim 12, wherein, in the data compensating step, a video data signal allocated to a source integrated circuit having a defect according to the delay information is compensated for an average of video data signals allocated to a source integrated circuits adjacent to the source integrated circuit having the defect.

14. A display device, comprising:

a display panel where a plurality of pixels are disposed;

a timing controller configured to output a sensing pulse through a first sensing line for determining moisture permeation in the plurality of pixels;

a plurality of source integrated circuits configured to receive the sensing pulse and output a plurality of delay pulses to the timing controller, wherein the timing controller is configured to compare timings of the plurality of delay pulses in a normal state and a defective state, to generate data reflecting the moisture permeation, to compensate for the video data signal based on the generated data reflecting the moisture permeation and configured to output a compensated video signal to the first source integrated circuit through a first feedback line, and wherein the plurality of source integrated circuits are configured to output a data voltage to the plurality of pixels in accordance with the compensated video data signal.

15. The display device according to claim 14, further comprising a plurality of connection films where the plurality of source integrated circuits are disposed.

16. The display device according to claim 15, further comprising a source printed circuit board where the first sensing line and the first feedback line are disposed.

17. The display device according to claim 16, wherein the source printed circuit board forms an RC circuit.

18. The display device according to claim 15, wherein the plurality of connection films connect the display panel and the plurality of source integrated circuits.

* * * * *